United States Patent
Xiao et al.

(10) Patent No.: US 11,875,620 B2
(45) Date of Patent: Jan. 16, 2024

(54) AUTO-CALIBRATION APPARATUS, DEVICE, AND SERVER, AUTO-CALIBRATION METHOD, AND STORAGE MEDIUM

(71) Applicant: NIO TECHNOLOGY (ANHUI) CO., LTD, Hefei (CN)

(72) Inventors: Bohong Xiao, Hefei (CN); Yiqi Han, Hefei (CN); Zheng Liu, Hefei (CN); Yunwei He, Hefei (CN); Yang Liu, Hefei (CN); Xinyi Kong, Hefei (CN)

(73) Assignee: NIO TECHNOLOGY (ANHUI) CO., LTD, Hefei (CN)

(*) Notice: Subject to any disclaimer, the term of this patent is extended or adjusted under 35 U.S.C. 154(b) by 19 days.

(21) Appl. No.: 17/573,402

(22) Filed: Jan. 11, 2022

(65) Prior Publication Data
US 2022/0222989 A1    Jul. 14, 2022

(30) Foreign Application Priority Data

Jan. 12, 2021 (CN) .......................... 202110035170.3

(51) Int. Cl.
*G07C 9/00* (2020.01)

(52) U.S. Cl.
CPC .................. *G07C 9/00309* (2013.01); *G07C 2009/00341* (2013.01); *G07C 2009/00769* (2013.01)

(58) Field of Classification Search
None
See application file for complete search history.

(56) References Cited

U.S. PATENT DOCUMENTS

| | | | | |
|---|---|---|---|---|
| 11,026,067 | B2* | 6/2021 | Martin | ...................... G01S 5/02 |
| 2018/0052466 | A1* | 2/2018 | Wu | ....................... G05D 1/0231 |
| 2019/0072950 | A1* | 3/2019 | Clark | .................... H04W 12/08 |
| 2019/0219661 | A1* | 7/2019 | Maynard | ............ G01S 5/02213 |
| 2021/0021962 | A1* | 1/2021 | Diaz Fuente | ....... H04W 64/006 |

(Continued)

FOREIGN PATENT DOCUMENTS

WO     WO 2005/121829     12/2005

OTHER PUBLICATIONS

Kim et al. "Auto Calibration Algorithm—Precise Indoor Localization System for a Mobile Robot Using Auto Calibration Algorithm," Journal of Korea Robotics Society, Mar. 2007, vol. 2, No. 1, pp. 40-47.

(Continued)

*Primary Examiner* — Carlos Garcia
(74) *Attorney, Agent, or Firm* — Sheridan Ross P.C.

(57) ABSTRACT

The invention relates to an auto-calibration apparatus, device, and server, an auto-calibration method, and a storage medium, where the auto-calibration apparatus includes: a communication unit configured to receive a target position; a positioning unit configured to determine a current position of the apparatus; a computing unit configured to generate a driving signal based on the target position and the current position; a driving unit configured to move the apparatus to the target position based on the driving signal; and a beacon unit configured to broadcast, at least at the target position, a beacon signal used for calibration. The auto-calibration apparatus may implement efficient auto-calibration on vehicles.

7 Claims, 6 Drawing Sheets

(56) References Cited

U.S. PATENT DOCUMENTS

2022/0222989 A1\* 7/2022 Xiao .................. H04L 67/12

OTHER PUBLICATIONS

Mahajan et al. "An automatic self-installation and calibration method for a 3D position sensing system using ultrasonics," Robotics and Autonomous Systems, 1999, vol. 28, No. 4, pp. 281-294.
Extended Search Report for European Patent Application No. 22150687.6, dated Oct. 21, 2022, 9 pages.

\* cited by examiner

60

AUTO-CALIBRATION APPARATUS, DEVICE, AND SERVER, AUTO-CALIBRATION METHOD, AND STORAGE MEDIUM

CROSS-REFERENCE TO RELATED APPLICATION

This application claims the benefit of China Patent Application No. 202110035170.3 filed Jan. 12, 2021, the entire contents of which are incorporated herein by reference in its entirety.

TECHNICAL FIELD

The invention relates to the field of vehicle calibration, and specifically, to an auto-calibration apparatus, device, and server, an auto-calibration method, and a storage medium.

BACKGROUND ART

More and more passive entry passive start (PEPS) systems has been deployed in vehicles due to their convenience. A basic operating principle of PEPS is closely related to a distance between a man who holds a key to a vehicle and the vehicle. To measure the distance between a man who holds a key to a vehicle and the vehicle, a specific electromagnetic signal emitted from the key needs to be acquired, and a distance value is to be obtained through analyzing the signal. This operation requires calibration on a characteristic of the vehicle receiving the electromagnetic signal. However, characteristics of different vehicles receiving the same electromagnetic signal are different, and even different interior and exterior decorations of the same type of vehicles may affect a characteristic of a vehicle receiving an electromagnetic signal. Therefore, it is necessary to propose a mechanism that can provide efficient auto-calibration on vehicles.

SUMMARY OF THE INVENTION

The invention is intended to provide a mechanism that can provide efficient auto-calibration on vehicles. Details are as follows:

According to an aspect of the invention, an auto-calibration apparatus is provided, the apparatus including: a communication unit configured to receive a target position; a positioning unit configured to determine a current position of the apparatus; a computing unit configured to generate a driving signal based on the target position and the current position; a driving unit configured to move the apparatus to the target position based on the driving signal; and a beacon unit configured to broadcast, at least at the target position, a beacon signal used for calibration.

In some embodiments of the invention, optionally, the driving unit includes: a driving motor configured to move on a calibration plane; and a support rod configured to move in a calibration vertical direction and extend or retract at a set angle.

In some embodiments of the invention, optionally, the driving unit further includes a set of universal wheels configured to be coupled to the driving motor.

In some embodiments of the invention, optionally, the positioning unit includes at least one of the following: a gyroscope, an optical positioning apparatus, an acoustic positioning apparatus, and an electromagnetic wave positioning apparatus.

In some embodiments of the invention, optionally, the beacon signal includes at least one of the following: a Bluetooth signal, an ultra-wideband signal, and a radio frequency signal.

In some embodiments of the invention, optionally, the communication unit is further configured to send an acquisition instruction after the apparatus reaches the target position, and the acquisition instruction includes position and angle information of the current position and an indication of requesting to acquire a signal.

In some embodiments of the invention, optionally, the communication unit is further configured to send an end instruction after a preset time is passed since the acquisition instruction is sent, and the end instruction includes an indication of requesting to end acquisition of a signal.

In some embodiments of the invention, optionally, the target position includes a plurality of positions.

According to another aspect of the invention, an auto-calibration device is provided, the device including: a communication unit configured to: receive an acquisition instruction and an end instruction that are from a requester side, and send calibration information to a server side, where the acquisition instruction includes position and angle information of a current position of the requester side and an indication of requesting to acquire a signal, and the end instruction includes an indication of requesting to end acquisition of a signal; a calibration unit configured to receive a beacon signal from the requester side and perform measurement to generate a measurement value; and a generation unit configured to generate the calibration information based on the measurement value and the position and angle information in the acquisition instruction after the end instruction is received.

In some embodiments of the invention, optionally, the measurement value includes at least one of the following: a signal strength indication of a Bluetooth signal and a distance value of an ultra-wideband signal.

According to another aspect of the invention, an auto-calibration server is provided, the server including: a storage unit configured to store a calibration case and calibration information of the calibration case, where the calibration case includes a target position; and a communication unit configured to: extract the calibration case, and send the target position related to the calibration case to a requester side and receive the calibration information from a vehicle side, where the calibration information includes position and angle information of the requester side and a measurement value of a beacon signal used for calibration.

In some embodiments of the invention, optionally, the server further includes an update unit configured to update and maintain the calibration case stored in the storage unit.

According to another aspect of the invention, an auto-calibration method using a calibration apparatus is provided, the method including: receiving a target position from a server side, and determining a current position of the calibration apparatus; generating a driving signal based on the target position and the current position; moving the calibration apparatus to the target position based on the driving signal; and broadcasting, at least at the target position, a beacon signal used for calibration.

In some embodiments of the invention, optionally, the moving the calibration apparatus to the target position based on the driving signal includes at least one of the following: moving on a calibration plane, and moving in a calibration vertical direction and extend or retract at a set angle.

In some embodiments of the invention, optionally, the beacon signal includes at least one of the following: a Bluetooth signal, an ultra-wideband signal, and a radio frequency signal.

In some embodiments of the invention, optionally, the method further includes: sending an acquisition instruction after the calibration apparatus reaches the target position, where the acquisition instruction includes position and angle information of the current position and an indication of requesting to acquire a signal.

In some embodiments of the invention, optionally, the method further includes: sending an end instruction after a preset time is passed since the acquisition instruction is sent, where the end instruction includes an indication of requesting to end acquisition of a signal.

In some embodiments of the invention, optionally, the target position includes a plurality of positions.

According to another aspect of the invention, an auto-calibration method is provided, the method including: receiving an acquisition instruction from a requester side, where the acquisition instruction includes position and angle information of a current position of the requester side and an indication of requesting to acquire a signal; receiving a beacon signal from the requester side and performing measurement to generate a measurement value; receiving an end instruction from the requester side, where the end instruction includes an indication of requesting to end acquisition of a signal; generating calibration information based on the measurement value and the position and angle information in the acquisition instruction; and sending the calibration information to a server side.

In some embodiments of the invention, optionally, the measurement value includes at least one of the following: a signal strength indication of a Bluetooth signal and a distance value of an ultra-wideband signal.

According to another aspect of the invention, an auto-calibration method is provided, the method including: extracting a calibration case, and sending a target position related to the calibration case to a requester side; and receiving calibration information of the calibration case from a vehicle side, where the calibration information includes position and angle information of the requester side and a measurement value of a beacon signal used for calibration.

In some embodiments of the invention, optionally, the method further includes: updating and maintaining the calibration case.

According to another aspect of the invention, a computer-readable storage medium is provided, where the computer-readable storage medium stores instructions, and the instructions, when executed by a processor, cause the processor to perform any one of the foregoing methods.

BRIEF DESCRIPTION OF THE DRAWINGS

The above and other objectives and advantages of the invention will be more thorough and clearer from the following detailed description in conjunction with the drawings, where the same or similar elements are represented by the same reference numerals.

DETAILED DESCRIPTION OF EMBODIMENTS

In the invention, an auto-calibration mechanism for vehicles provided below can accurately cover all calibration points, and compared with conventional artificial calibration, would not cause errors of calibration due to gaps of individual skills or experience. According to a principle of the calibration mechanism in the invention, a space can be automatically divided into a welcome locking-unlocking area, a common locking-unlocking area, and a start-up area, where the division is relatively highly precise.

Figure 1:
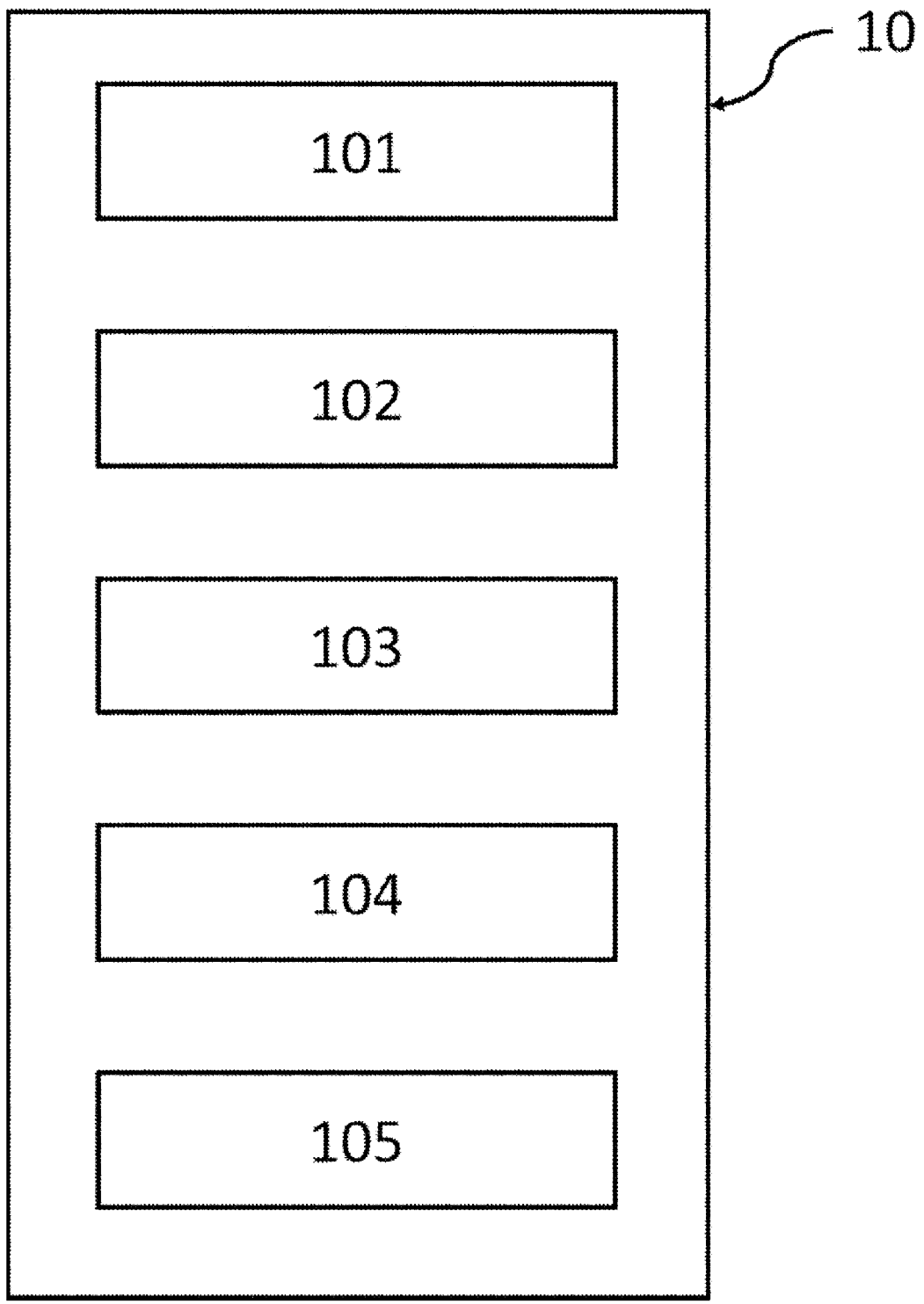
FIG. 1 shows an auto-calibration apparatus according to an embodiment of the invention.

According to an aspect of the invention, an auto-calibration apparatus is provided. As shown in FIG. 1, the auto-calibration apparatus 10 includes a communication unit 101, a positioning unit 102, a computing unit 103, a driving unit 104, and a beacon unit 105. The communication unit 101 is configured to receive a target position. The communication unit 101 is used for enabling the auto-calibration apparatus 10 to receive and send information. Because the auto-calibration apparatus 10 needs to move constantly in a process of calibration, generally, the communication unit 101 may use wireless communication. Certainly, under the premise of not affecting movement of the auto-calibration apparatus 10, the communication unit 101 may alternatively work in a wired communication manner. This is not limited in the invention.

In some examples, the target position received by the communication unit 101 may include only one specific position. In this case, to implement a calibration operation, the communication unit 101 needs to receive the target position a plurality of times. In some examples, the target position received by the communication unit 101 may include a plurality of positions. The auto-calibration apparatus 10 can traverse the positions in a specific logical order, to complete the calibration operation. If the target position received by the communication unit 101 includes a plurality of positions, it can be considered that a calibration case or a complete calibration task is received. Compared with conventional manual calibration, the auto-calibration apparatus 10 can measure more positions, and efficiency thereof is also greatly improved. In some examples, the target position is not limited to two-dimensional/three-dimensional spatial coordinates, and may further include angle information based on requirements.

The positioning unit 102 of the auto-calibration apparatus 10 is configured to determine a current position of the auto-calibration apparatus 10. The current position mentioned herein means position information at a moment of measurement, and the position information is not limited to two-dimensional/three-dimensional spatial coordinates either, and may include angle information (for example, a rotation status of the auto-calibration apparatus 10 relative to an initial status) based on requirements.

In some embodiments of the invention, the positioning unit 102 may be a gyroscope, an optical positioning apparatus, an acoustic positioning apparatus, an electromagnetic wave positioning apparatus, or a combination thereof. The optical positioning apparatus may include one or more cameras, for example, may use the cameras to capture a position of an object and position the auto-calibration apparatus 10 based on a change of the position. Similarly, the acoustic positioning apparatus uses acoustic waves to measure a relative distance, to perform positioning. The electromagnetic wave positioning apparatus uses electromagnetic waves to measure a relative distance, to perform positioning.

The computing unit 103 of the auto-calibration apparatus 10 is configured to generate a driving signal based on the target position and the current position. The driving signal in the example of the invention is used to enable a power apparatus to form a moving path from the current position to the target position. It should be noted that the communication unit 101, the computing unit 103, and the like described above may be integrated on a same common development module which, for example, may be a small development board such as Raspberry Pi. Compared with a conventional calibration solution, the auto-calibration apparatus 10 in the present application has a much lower requirement on computing power, and a difficulty of developing software and hardware is significantly lowered.

The driving unit 104 of the auto-calibration apparatus 10 is configured to move the apparatus to the target position based on the driving signal. The driving signal may include control instructions that are sent to drivers of, for example, various electric motors, such that a power apparatus such as an electric motor is triggered to transfer the auto-calibration apparatus 10 from the current position to the target position based on the driving signal.

In some embodiments of the invention, the driving unit 104 includes a driving motor and a support rod. The driving motor is configured to move on a calibration plane, and the support rod is configured to move in a calibration vertical direction and extend or retract at a set angle. In some embodiments of the invention, the driving unit 104 further includes a set of universal wheels configured to be coupled to the driving motor.

Figure 6:
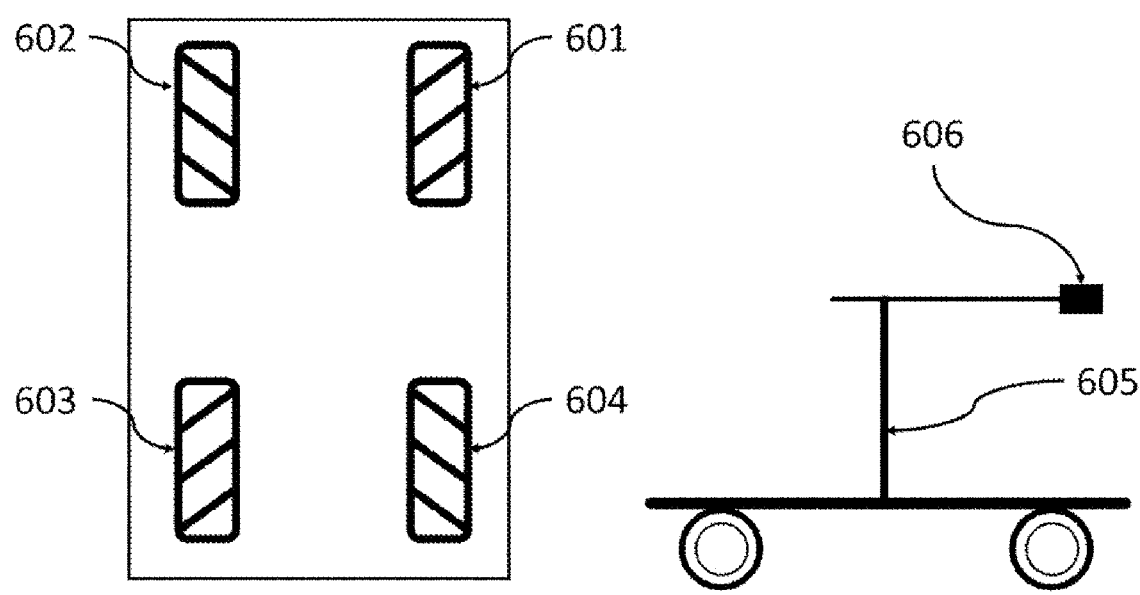
FIG. 6 shows an auto-calibration apparatus according to an embodiment of the invention.

As shown in FIG. 6, an auto-calibration apparatus 60 is in a form of a trolley. For clear illustration of a principle, some parts of the auto-calibration apparatus 60 are omitted. Referring to FIG. 6, the auto-calibration apparatus 60 includes wheels 601, 602, 603, and 604 that are coupled to a driving motor (not shown). As shown in the figure, the wheels 601, 602, 603, and 604 form a set of universal wheels in a manner of combination on tire surfaces. The following describes in detail that a beacon unit 606 is placed at an end of a support rod 605. In some examples, each wheel has a matching driving motor, and when driven by the driving motor, the auto-calibration apparatus 10 may move on a two-dimensional calibration plane. The calibration plane in the example of the invention means a projection of, a position to which a calibration operation may reach, onto the horizontal plane.

The support rod 605 includes a part perpendicular to the calibration plane and a part parallel to the calibration plane, where the perpendicular part may trigger the beacon unit 606 to move in a calibration vertical direction (that is, a direction perpendicular to the calibration plane), and the horizontal part may trigger the beacon unit 606 to extend or retract at a set angle (that is, to move forward or backward at the set angle). It should be noted that, a changing angle may be formed between the horizontal part and, for example, an axial direction of the auto-calibration apparatus 60 shown in FIG. 6 (for example, a long symmetry axis of the rectangular trolley), and this angle may be considered as the "set angle" mentioned above.

The auto-calibration apparatus 10/auto-calibration apparatus 60 (specifically, the beacon unit 105) configured in the foregoing manner can implement a particular trajectory that cannot be implemented in a conventional solution, for example, in-situ spinning, longitudinal spinning, curvy retraction, figure-eight pattern reciprocation, etc.

The beacon unit 105 of the auto-calibration apparatus 10 is configured to broadcast a beacon signal used for calibration. For example, the beacon unit 105 may broadcast the beacon signal at least at the target position. In an embodiment, after driving the beacon unit 105 to the target position, the driving unit 104 may send an arrival notification to the beacon unit 105, and then the beacon unit 105 may broadcast the beacon signal at the target position based on the notification. In another example, the beacon unit 105 may alternatively broadcast the beacon signal at any position (where the current position and the target position are included) in a process of moving from the current position to the target position. For example, the beacon unit 105 herein may be an automobile key or a mobile phone that transmits a beacon signal, where the beacon signal is a PEPS working signal sent when the automobile key or the mobile phone works. Generally, the beacon signal has a fixed level characteristic. In some embodiments of the invention, the beacon signal may be a Bluetooth signal, an ultra-wideband signal, a radio frequency signal, etc. The auto-calibration apparatus 10 in the example of the invention may calibrate a vehicle that supports these types of signals.

In some embodiments of the invention, the communication unit 101 of the auto-calibration apparatus 10 is further configured to send an acquisition instruction after the auto-calibration apparatus 10 reaches the target position, and the acquisition instruction includes position and angle information of the current position and an indication of requesting to acquire a signal. The acquisition instruction may be received by an auto-calibration device described below.

In some embodiments of the invention, the communication unit 101 of the auto-calibration apparatus 10 is further configured to send an end instruction after a preset time is passed since the acquisition instruction is sent, and the end instruction includes an indication of requesting to end acquisition of a signal. The preset time may be preset duration for signal acquisition, and the end instruction may be received by the auto-calibration device described below.

Figure 2:
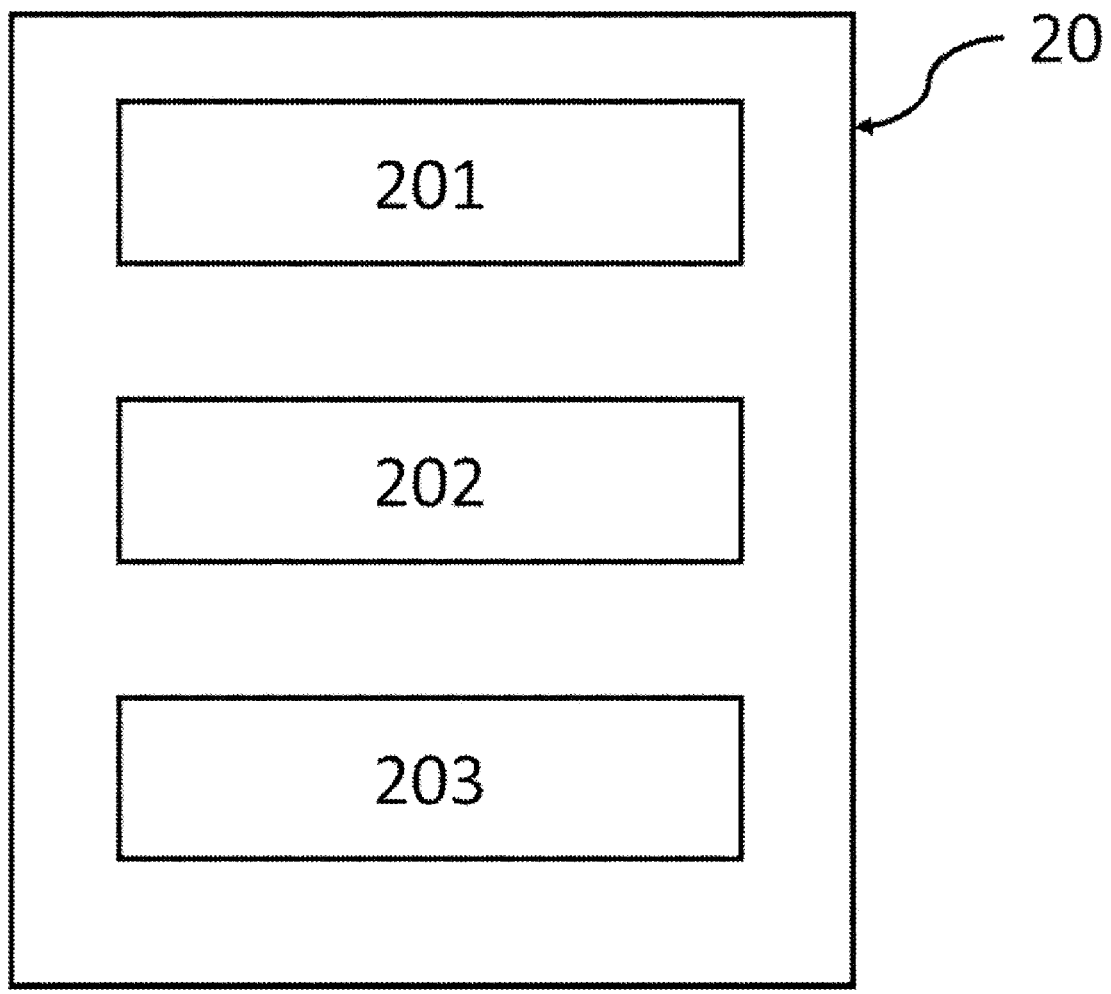
FIG. 2 shows an auto-calibration device according to an embodiment of the invention.

According to another aspect of the invention, an auto-calibration device is provided. The auto-calibration device is mounted at positions where calibration for a vehicle is to be performed (so that the auto-calibration device is referred to as a vehicle side sometimes in the present application), and after the calibration is completed, a vehicle-mounted PEPS signal capturing unit is mounted at these positions. As shown in FIG. 2, an auto-calibration device 20 includes a communication unit 201, a calibration unit 202, and a generation unit 203. The communication unit 201 is configured to: receive an acquisition instruction and an end instruction that are from a requester side (for example, the auto-calibration apparatus 10 shown in FIG. 1), and send calibration information to a server side (for example, an auto-calibration server 30 shown in FIG. 3). The acquisition instruction received from the requester side includes position and angle information of a current real-time position of the requester side and an indication of requesting to acquire a signal. The auto-calibration device 20 performs a calibration operation based on the information and the indication. The end instruction includes an indication of requesting to end acquisition of a signal. The auto-calibration device 20 suspends a calibration operation based on the indication.

The calibration unit 202 of the auto-calibration device 20 is configured to receive a beacon signal from the requester side and perform measurement to generate a measurement value. For example, the beacon unit 105 of the auto-calibration apparatus 10 in FIG. 1 is configured to broadcast a beacon signal used for calibration. The calibration unit 202 of the auto-calibration device 20 may receive and then measure the beacon signal. Based on a difference between beacon signals, there are different types of measurement values. In some embodiments of the invention, the beacon signal may be a Bluetooth signal or an ultra-wideband signal. Correspondingly, the measurement value is a signal strength indication of the Bluetooth signal or a distance value of the ultra-wideband signal.

The generation unit 203 of the auto-calibration device 20 is configured to generate the calibration information based on the measurement value and the position and angle information in the acquisition instruction after the end instruction is received, where the calibration information includes a mapping relationship between the measurement value and the position and angle information in the acquisition instruction. In some examples of the invention, the generation unit 203 may alternatively give a time stamp to the calibration information for subsequent processing.

Figure 3:
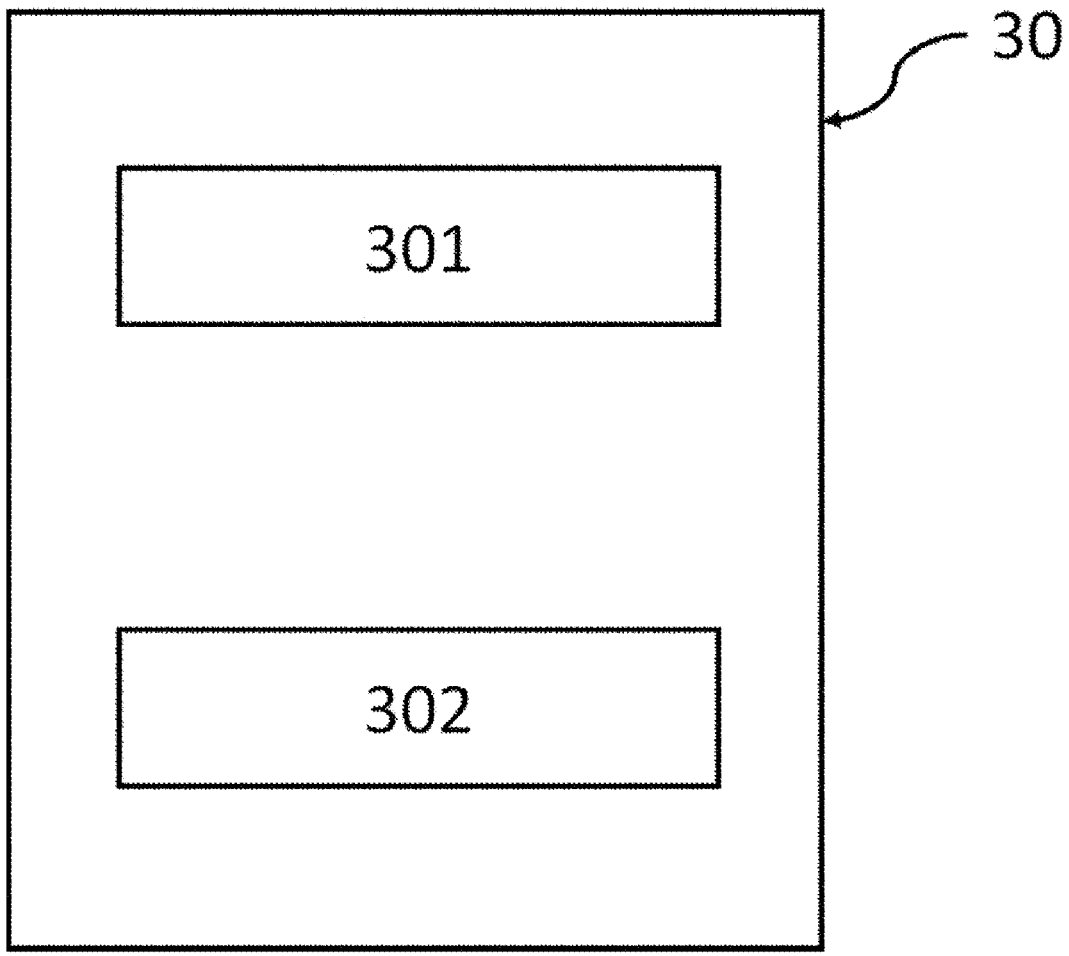
FIG. 3 shows an auto-calibration server according to an embodiment of the invention.

According to another aspect of the invention, an auto-calibration server is provided. As shown in FIG. 3, an auto-calibration server 30 includes a storage unit 301 and a communication unit 302. The storage unit 301 is configured to store a calibration case and calibration information of the calibration case, where the calibration case includes a target position. The calibration case may be associated with a vehicle type, or may be associated with different interior and exterior decorations of the vehicle type. The calibration case includes information used to indicate, for example, various positions where calibration is performed by the auto-calibration apparatus 10 in FIG. 1. The storage unit 301 may be further used to store the calibration information of the calibration case. In this way, the entire maintaining operation for calibration is transferred to the server side, and there are much lower requirements on computing power of the vehicle side and the requester side. Because the auto-calibration server 30 may serve not only one type of vehicle, overall costs may be reduced, and no device such as an extra operator terminal or a low-frequency trigger is needed on the vehicle side.

The communication unit 302 of the auto-calibration server 30 is configured to extract a calibration case, and send a target position related to a calibration case to a requester side (such as the auto-calibration apparatus 10 in FIG. 1). Calibration at the target position in the calibration case may be carried out according to FIG. 1 and a corresponding example. In addition, the communication unit 302 is further configured to receive the calibration information from the vehicle side (such as the auto-calibration device 20 shown in FIG. 2). Generation of the calibration information may be carried out according to FIG. 2 and a corresponding example, where the calibration information includes the position and angle information of the requester side and the measurement value of the beacon signal used for calibration. This facilitates traceback of historical data, and can perform simulation tests on calibration data, thereby greatly improving calibration efficiency.

In some embodiments of the invention, the auto-calibration server 30 further includes an update unit (not shown), where the update unit is configured to update and maintain the calibration case stored in the storage unit 301. For example, the update unit deletes, adds, or modifies one or some of calibration positions, such that a calibration result reflects actual usage better. Even if the calibration encounters a problem, the update unit may be used to remotely modify a path and adjust a data collection procedure. In addition, this facilitates creating of a calibration database across projects and vehicle types, thereby benefiting subsequent upgrading and optimization.

Figure 5:
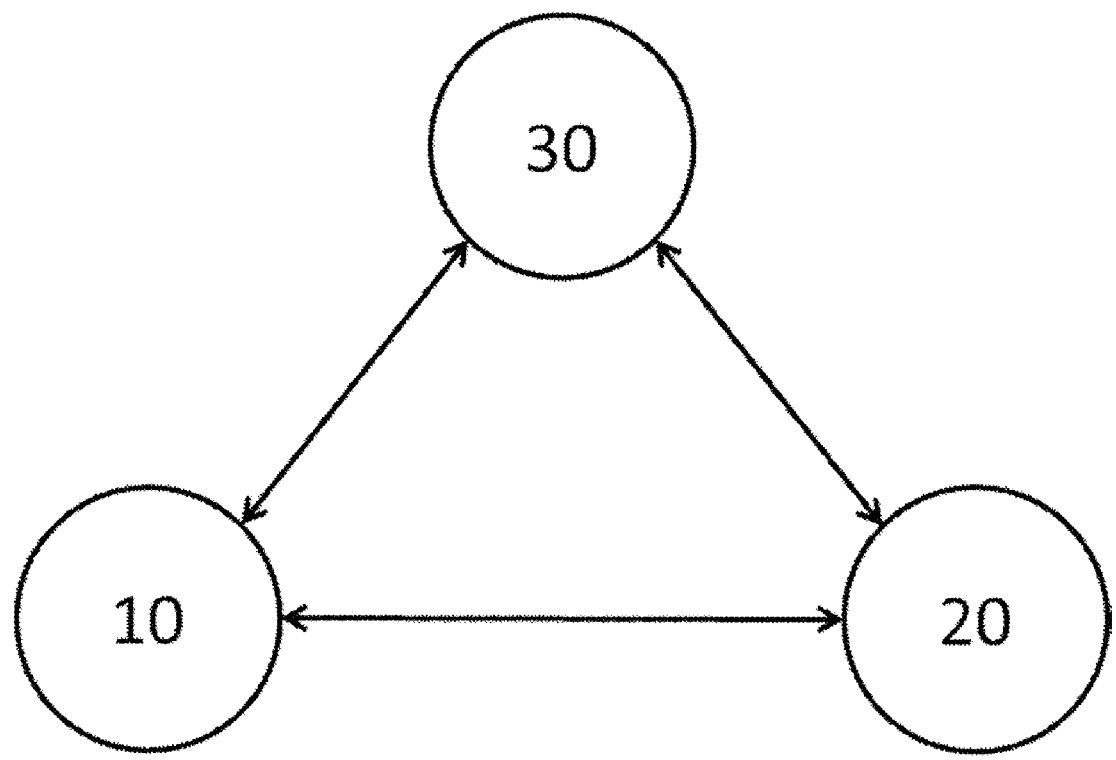
FIG. 5 shows an auto-calibration system according to an embodiment of the invention.

FIG. 5 shows an auto-calibration system 50 according to the invention. The auto-calibration system 50 includes the auto-calibration apparatus 10 in FIG. 1, the auto-calibration device 20 in FIG. 2, and the auto-calibration server 30 in FIG. 3, where various parts of the auto-calibration system 50 can communicate with one another. Although a two-way communication path is shown for each part in the figure, certainly, in some examples, a one-way communication path is enough for achieving the purpose of the invention.

Figure 4:
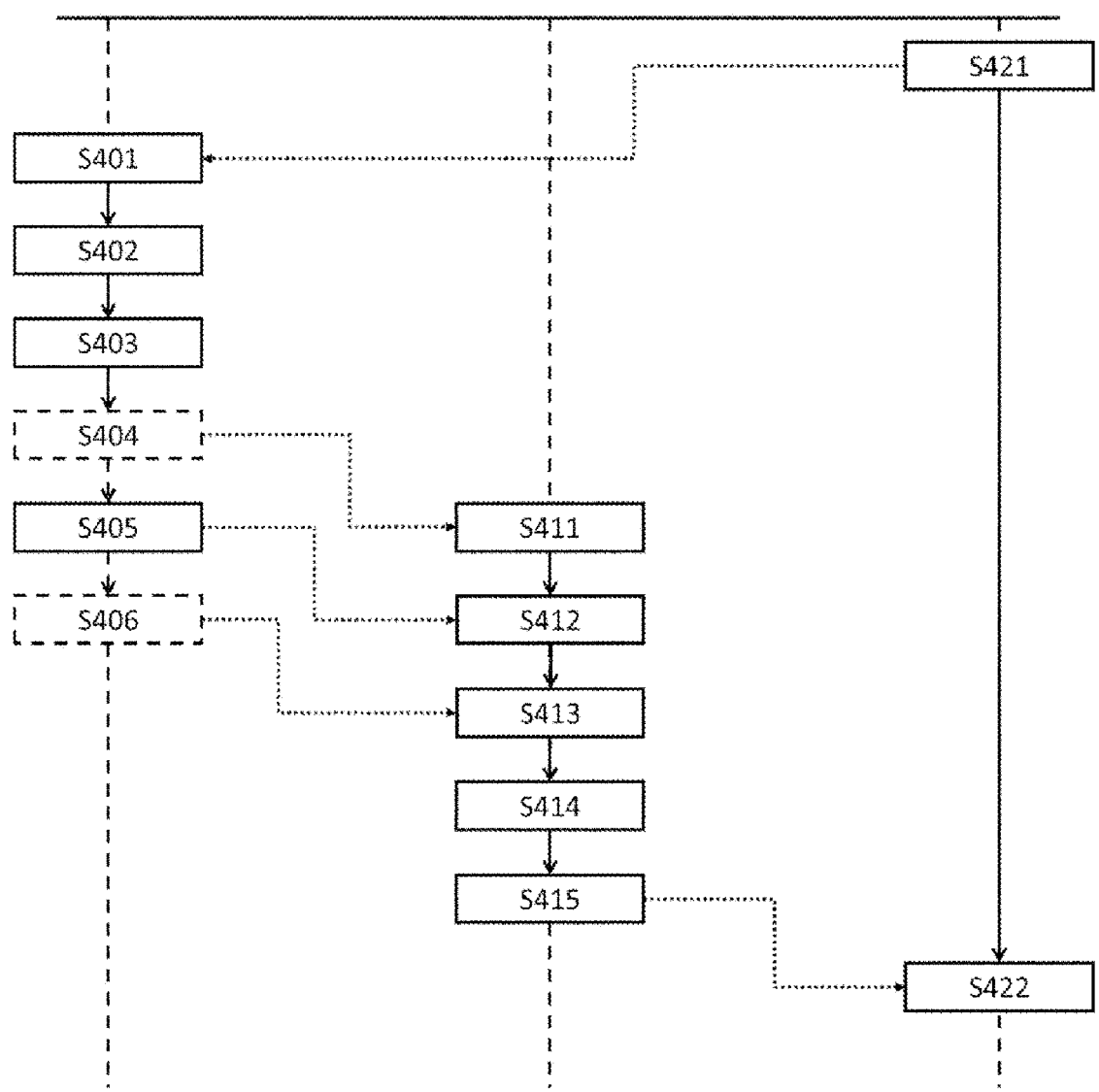
FIG. 4 shows an auto-calibration method according to an embodiment of the invention.

FIG. 4 shows an auto-calibration method according to an embodiment of the invention. For clear description the principle of the invention, in FIG. 4, auto-calibration methods for different entities (that is, a requester side, a vehicle side, and a server side) are described in one method, but after reading the present application, those skilled in the art will understand that the auto-calibration methods for the different entities may be independently performed.

According to another aspect of the invention, an auto-calibration method using a calibration apparatus (a requester side) is provided. As shown in FIG. 4, the auto-calibration method includes the following steps. In step S401, a target position from a server side is received, and a current position of the calibration apparatus is determined; in step S402, a driving signal is generated based on the target position and the current position; in step S403, the calibration apparatus is moved to the target position based on the driving signal; and in step S405, a beacon signal used for calibration is broadcast.

In the auto-calibration method, in step S401, the target position (generated in step S421, where a dotted line with an arrow in the figure indicates a source, which is the same below) from the server side is received, and the current position of the calibration apparatus is determined. In some examples, the target position received by the calibration apparatus may include only one specific position. In this case, to implement a calibration operation, the calibration apparatus needs to repeat the step of receiving the target position a plurality of times. In some examples, the target position received by the calibration apparatus may include a plurality of positions. The calibration apparatus can traverse the positions in a specific logical order, to complete the calibration operation. If the target position received by the calibration apparatus includes a plurality of positions, it can be considered that a calibration case or a complete calibration task is received. Compared with conventional manual calibration, the calibration apparatus can measure more positions, and efficiency thereof is also greatly improved. In some examples, the target position is not limited to two-dimensional/three-dimensional spatial coordinates, and may further include angle information based on requirements.

The current position determined in step S401 means position information at a moment of measurement, and the position information is not limited to two-dimensional/three-dimensional spatial coordinates either, and may include angle information (for example, a rotation status of the calibration apparatus relative to an initial status) based on requirements.

In the auto-calibration method, in step S402, the driving signal is generated based on the target position and the current position. The driving signal in the example of the invention is used to enable a power apparatus to form a moving path from the current position to the target position.

Compared with a conventional calibration solution, the calibration apparatus in the present application has a much lower requirement on computing power, and a difficulty of developing software and hardware is significantly lowered.

In the auto-calibration method, in step S403, the calibration apparatus is moved to the target position based on the driving signal. The driving signal may include control instructions that are sent to drivers of, for example, various electric motors, such that a power apparatus such as an electric motor is triggered to transfer the calibration apparatus from the current position to the target position based on the driving signal.

In some embodiments of the invention, moving to the target position in step S403 includes: moving on a calibration plane, and moving in a calibration vertical direction and extend or retract at a set angle. In this way, the auto-calibration method in some examples of the present application can implement a particular trajectory that cannot be implemented in a conventional solution, for example, in-situ spinning, longitudinal spinning, curvy retraction, figure-eight pattern reciprocation, etc.

In the auto-calibration method, in step S405, the beacon signal used for calibration is broadcast. For example, in step S405, the beacon signal may be broadcast at least at the target position. In step S403, after, for example, a beacon unit is driven to the target position, an arrival notification may be sent to the beacon unit, and then the beacon unit may broadcast the beacon signal at the target position based on the notification. In another example, in step S405, the beacon signal may alternatively be broadcast at any position (where the current position and the target position are included) in a process of moving from the current position to the target position. For example, an actual PEPS part such as an automobile key or a mobile phone may be used to transmit a beacon signal, where the beacon signal is a PEPS working signal sent when the automobile key or the mobile phone works. Generally, the beacon signal has a fixed level characteristic. In some embodiments of the invention, the beacon signal may be a Bluetooth signal, an ultra-wideband signal, a radio frequency signal, etc. The calibration apparatus in the example of the invention may calibrate a vehicle that supports these types of signals.

In some embodiments of the invention, the auto-calibration method further includes step S404 (a dashed box in the figure): An acquisition instruction is sent after the calibration apparatus reaches the target position, where the acquisition instruction includes position and angle information of the current position and an indication of requesting to acquire a signal, and may be received in step S411 shown in the figure.

In some embodiments of the invention, the auto-calibration method further includes step S406 (a dashed box in the figure): An end instruction is sent after a preset time is passed since the acquisition instruction is sent, where the end instruction includes an indication of requesting to end acquisition of a signal. The preset time may be preset duration for signal acquisition, and the end instruction may be received in step S413 shown in the figure.

According to another aspect of the invention, an auto-calibration method is provided. As shown in FIG. 4, the auto-calibration method includes the following steps. In step S411, an acquisition instruction from a requester side is received, where the acquisition instruction includes position and angle information of a current position of the requester side and an indication of requesting to acquire a signal. An auto-calibration device, etc. performs a calibration operation based on the information and the indication. In step S412, a beacon signal from the requester side is received and measurement is performed to generate a measurement value. In step S413, an end instruction from the requester side is received, where the end instruction includes an indication of requesting to end acquisition of a signal. An auto-calibration device, etc. suspends a calibration operation based on the indication. In step S414, calibration information is generated based on the measurement value and the position and angle information in the acquisition instruction. In step S415, the calibration information is sent to a server side (and is received in step S422).

In the auto-calibration method, in step S412, the beacon signal from the requester side is received and measurement is performed to generate the measurement value. Based on a difference between beacon signals, there are different types of measurement values. In some embodiments of the invention, the beacon signal may be a Bluetooth signal or an ultra-wideband signal. Correspondingly, the measurement value is a signal strength indication of the Bluetooth signal or a distance value of the ultra-wideband signal.

In the auto-calibration method, in step S414, the calibration information is generated based on the measurement value and the position and angle information in the acquisition instruction, where the calibration information includes a mapping relationship between the measurement value and the position and angle information in the acquisition instruction. In some examples of the invention, in step S414, a time stamp may alternatively be given to the calibration information for subsequent processing.

According to another aspect of the invention, an auto-calibration method is provided. As shown in FIG. 4, the auto-calibration method includes the following steps. In step S421, a calibration case is extracted, and a target position related to the calibration case is sent to the requester side. The calibration case may be associated with a vehicle type, or may be associated with different interior and exterior decorations of the vehicle type. The calibration case includes information used to indicate, for example, various positions where calibration is performed by the auto-calibration apparatus 10 in FIG. 1. In this way, the entire maintaining operation for calibration is transferred to the server side, and there are much lower requirements on computing power of the vehicle side and the requester side. Because the server side may serve not only one type of vehicle, overall costs may be reduced, and no device such as an extra operator terminal or a low-frequency trigger is needed on the vehicle side.

In the auto-calibration method, in step S422, the calibration information of the calibration case is received from the vehicle side, where the calibration information includes position and angle information of the requester side and a measurement value of a beacon signal used for calibration. This facilitates traceback of historical data, and can perform simulation tests on calibration data, thereby greatly improving calibration efficiency.

In some embodiments of the invention, the auto-calibration method further includes: The calibration case is updated and maintained. For example, in this step, an update unit may delete, add, or modify one or some of calibration positions, such that a calibration result reflects actual usage better. Even if the calibration encounters a problem, a path may be remotely modified, and a data collection procedure may be adjusted. In addition, this facilitates creating of a calibration database across projects and vehicle types, thereby benefiting subsequent upgrading and optimization.

According to another aspect of the invention, a computer-readable storage medium is provided, where the computer-readable storage medium stores instructions, and the instructions, when executed by a processor, cause the processor to perform any one of the foregoing methods. The computer-readable storage medium in the invention includes various computer storage media, and may be any usable medium accessible to a general-purpose or special-purpose computer. For example, the computer-readable storage medium may include a RAM, a ROM, an EPROM, an EEPROM, a register, a hard disk, a removable hard disk, a CD-ROM or another optical memory, a magnetic disk memory or another magnetic storage device, or any other transitory or non-transitory media that can carry or store expected program code having an instruction or data structure form and be accessible to the general-purpose or special-purpose computer or a general-purpose or special-purpose processor. As used in this specification, a disk and a disc includes a compact disc (CD), a laser disc, an optical disc, a digital versatile disc (DVD), a floppy disk, and a Blu-ray disc, where data is usually copied magnetically in a disk, and data is usually copied optically by using lasers in a disc. A combination thereof shall also fall within the protection scope of computer-readable media. For example, the storage medium is coupled to a processor, so that the processor can read data from and write data to the storage medium. In an alternative solution, the storage medium may be integrated into the processor. The processor and the storage medium may reside in an ASIC. The ASIC may reside in a user terminal. In an alternative solution, the processor and the storage medium may reside as discrete assemblies in a user terminal.

The foregoing examples mainly describe the auto-calibration apparatus, device, and server, the auto-calibration method, and the storage medium of the invention. Although only some embodiments of the invention are described, it will be appreciated by those skilled in the art that the invention may be embodied in many other forms without departing from the essence and scope thereof. Accordingly, the presented examples and implementations are considered to be illustrative rather than restrictive, and the invention may encompass various modifications and replacements without departing from the spirit and scope of the invention that are defined by the appended claims.

What is claimed is:

1. An auto-calibration apparatus, comprising:
   a communication unit configured to receive a target position;
   a positioning unit configured to determine a current position of the auto-calibration apparatus;
   a computing unit configured to generate a driving signal based on the target position and the current position;
   a driving unit configured to move the auto-calibration apparatus to the target position based on the driving signal, wherein the driving unit comprises:
      a driving motor configured to move on a calibration plane; and
      a support rod configured to move in a calibration vertical direction and extend or retract at a set angle; and
   a beacon unit configured to broadcast, at least at the target position, a beacon signal used for calibration.

2. The auto-calibration apparatus according to claim 1, wherein the driving unit further comprises a set of universal wheels configured to be coupled to the driving motor.

3. The auto-calibration apparatus according to claim 1, wherein the positioning unit comprises at least one of the following: a gyroscope, an optical positioning apparatus, an acoustic positioning apparatus, and an electromagnetic wave positioning apparatus.

4. The auto-calibration apparatus according to claim 1, wherein the beacon signal comprises at least one of the following: a Bluetooth signal, an ultra-wideband signal, and a radio frequency signal.

5. The auto-calibration apparatus according to claim 1, wherein the communication unit is further configured to send an acquisition instruction after the auto-calibration apparatus reaches the target position, and the acquisition instruction comprises position and angle information of the current position and an indication of requesting to acquire a signal.

6. The auto-calibration apparatus according to claim 5, wherein the communication unit is further configured to send an end instruction after a preset time is passed since the acquisition instruction is sent, and the end instruction comprises an indication of requesting to end acquisition of a signal.

7. The auto-calibration apparatus according to claim 1, wherein the target position comprises a plurality of positions.

* * * * *